(12) United States Patent
Minemura et al.

(10) Patent No.: US 7,852,729 B2
(45) Date of Patent: Dec. 14, 2010

(54) OPTICAL DISC APPARATUS WITH ADJUSTABLE CONSTRAINT LENGTH PRML

(75) Inventors: Hiroyuki Minemura, Kokubunji (JP); Atsushi Kikugawa, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 687 days.

(21) Appl. No.: 11/092,872

(22) Filed: Mar. 30, 2005

(65) Prior Publication Data

US 2006/0087947 A1  Apr. 27, 2006

(30) Foreign Application Priority Data

Oct. 21, 2004  (JP)  ............................. 2004-306320

(51) Int. Cl.
*G11B 27/30* (2006.01)
(52) U.S. Cl. .................................... 369/59.23
(58) Field of Classification Search ............... 369/59.22
See application file for complete search history.

(56) References Cited

U.S. PATENT DOCUMENTS

| | | | | |
|---|---|---|---|---|
| 5,469,462 A | * | 11/1995 | Kahlman et al. | 375/232 |
| 5,661,709 A | * | 8/1997 | Takagi et al. | 369/59.22 |
| 5,724,330 A | * | 3/1998 | Kobayashi et al. | 369/59.2 |
| 5,986,987 A | * | 11/1999 | Taguchi et al. | 369/47.35 |
| 5,995,465 A | * | 11/1999 | Hayashi et al. | 369/47.28 |
| 6,304,617 B1 | * | 10/2001 | Okamoto | 375/341 |
| 6,333,907 B1 | | 12/2001 | Iwata et al. | |
| 6,408,023 B1 | * | 6/2002 | Abdesselem et al. | 375/232 |
| 6,418,101 B1 | * | 7/2002 | Finkelstein | 369/47.18 |
| 6,545,965 B1 | * | 4/2003 | Hayashi | 369/59.12 |
| 6,646,574 B2 | * | 11/2003 | Maeda et al. | 341/58 |
| 6,678,230 B2 | * | 1/2004 | Miyashita et al. | 369/53.16 |
| 7,079,467 B2 | * | 7/2006 | Indukumar et al. | 369/59.22 |
| 7,099,244 B2 | * | 8/2006 | Nakata et al. | 369/47.19 |
| 7,139,231 B2 | * | 11/2006 | Nagai et al. | 369/59.22 |
| 2001/0055355 A1 | | 12/2001 | Okamoto | |
| 2002/0071194 A1 | | 6/2002 | Honma | |
| 2003/0174622 A1 | * | 9/2003 | Nagai et al. | 369/59.22 |
| 2004/0208106 A1 | | 10/2004 | Minemura | |
| 2005/0094539 A1 | | 5/2005 | Minemura et al. | |

FOREIGN PATENT DOCUMENTS

JP  10-106161  4/1998

(Continued)

OTHER PUBLICATIONS

U.S. Appl. No. 10/744,587, filed Feb. 10, 2004, Hiroyuki et al.

*Primary Examiner*—Hoa T Nguyen
*Assistant Examiner*—Mark L Fischer
(74) *Attorney, Agent, or Firm*—Antonelli, Terry, Stout & Kraus, LLP.

(57) ABSTRACT

An optical disc apparatus implementing a PRML and capable of recording and reading a plurality of disc media with different recording densities, wherein read compatibility between drives is ensured without relying solely on the error correction capability of the ECC (error correction code). A phase comparator provided in a PLL compares each value of an input signal sequence with a designated threshold value in order to determine an edge. The optical disc apparatus can record and read a plurality of disc media with different recording densities while ensuring read compatibility.

6 Claims, 19 Drawing Sheets

FOREIGN PATENT DOCUMENTS

| | | |
|---|---|---|
| JP | 10-172250 | 6/1998 |
| JP | 10-334605 | 12/1998 |
| JP | 11-296987 | 10/1999 |
| JP | 11-328860 | 11/1999 |
| JP | 2000-182335 | 6/2000 |
| JP | 2001-156652 A | 6/2001 |
| JP | 2002-008322 A | 1/2002 |
| JP | 2002-175673 | 6/2002 |

\* cited by examiner

FALSE EDGE

| No. | BIT SEQUENCE | | | LEVEL |
|---|---|---|---|---|
| 1 | 0 | 0 | 0 | -4 |
| 2 | 0 | 0 | 1 | -2 |
| 3 | 0 | 1 | 1 | 2 |
| 4 | 1 | 0 | 0 | -2 |
| 5 | 1 | 1 | 0 | 2 |
| 6 | 1 | 1 | 1 | 4 |

| No. | BIT SEQUENCE | | | | | LEVEL |
|---|---|---|---|---|---|---|
| 1 | 0 | 0 | 0 | 0 | 0 | -8 |
| 2 | 0 | 0 | 0 | 0 | 1 | -6 |
| 3 | 0 | 0 | 0 | 1 | 1 | -2 |
| 4 | 0 | 0 | 1 | 1 | 0 | 0 |
| 5 | 0 | 0 | 1 | 1 | 1 | 2 |
| 6 | 0 | 1 | 0 | 0 | 1 | -2 |
| 7 | 0 | 1 | 1 | 0 | 0 | 0 |
| 8 | 0 | 1 | 1 | 1 | 0 | 4 |
| 9 | 0 | 1 | 1 | 1 | 1 | 6 |
| 10 | 1 | 0 | 0 | 0 | 0 | -6 |
| 11 | 1 | 0 | 0 | 0 | 1 | -4 |
| 12 | 1 | 0 | 0 | 1 | 1 | 0 |
| 13 | 1 | 0 | 1 | 1 | 0 | 2 |
| 14 | 1 | 1 | 0 | 0 | 0 | -2 |
| 15 | 1 | 1 | 0 | 0 | 1 | 0 |
| 16 | 1 | 1 | 1 | 0 | 0 | 2 |
| 17 | 1 | 1 | 1 | 1 | 0 | 6 |
| 18 | 1 | 1 | 1 | 1 | 1 | 8 |

| No. | BIT SEQUENCE | | | | | LEVEL |
|---|---|---|---|---|---|---|
| 1 | 0 | 0 | 0 | 0 | 0 | -4 |
| 2 | 0 | 0 | 0 | 0 | 1 | -2 |
| 3 | 0 | 0 | 0 | 1 | 1 | 2 |
| 4 | 0 | 0 | 1 | 1 | 0 | 2 |
| 5 | 0 | 0 | 1 | 1 | 1 | 4 |
| 6 | 0 | 1 | 0 | 0 | 1 | -2 |
| 7 | 0 | 1 | 1 | 0 | 0 | -2 |
| 8 | 0 | 1 | 1 | 1 | 0 | 2 |
| 9 | 0 | 1 | 1 | 1 | 1 | 4 |
| 10 | 1 | 0 | 0 | 0 | 0 | -4 |
| 11 | 1 | 0 | 0 | 0 | 1 | -2 |
| 12 | 1 | 0 | 0 | 1 | 1 | 2 |
| 13 | 1 | 0 | 1 | 1 | 0 | 2 |
| 14 | 1 | 1 | 0 | 0 | 0 | -4 |
| 15 | 1 | 1 | 0 | 0 | 1 | -2 |
| 16 | 1 | 1 | 1 | 0 | 0 | -2 |
| 17 | 1 | 1 | 1 | 1 | 0 | 2 |
| 18 | 1 | 1 | 1 | 1 | 1 | 4 |

FIG.12

| ITEM | PR(1,2,1) | PR(0,0,1,2,1) |
|---|---|---|
| CONSTRAINT LENGTH | 3 | 5 |
| NUMBER OF BIT SEQUENCES | 6 | 18 |
| NUMBER OF STATES | 3 | 9 |
| NUMBER OF LEVELS | 5 | 5 |
| SAMPLING | EDGE ASYNCHRONOUS | EDGE ASYNCHRONOUS |
| PHASE ADJUSTMENT BY FIR FILTER | NOT REQUIRED | NOT REQUIRED |
| NUMBER OF EFFECTIVE TAPS OF FIR FILTER | NUMBER OF IMPLEMENTATIONS | NUMBER OF IMPLEMENTATIONS |

| No. | BIT SEQUENCE | | | | LEVEL |
|---|---|---|---|---|---|
| 1 | 0 | 0 | 0 | 0 | -6 |
| 2 | 0 | 0 | 0 | 1 | -4 |
| 3 | 0 | 0 | 1 | 1 | 0 |
| 4 | 0 | 1 | 1 | 0 | 2 |
| 5 | 0 | 1 | 1 | 1 | 4 |
| 6 | 1 | 0 | 0 | 0 | -4 |
| 7 | 1 | 0 | 0 | 1 | -2 |
| 8 | 1 | 1 | 0 | 0 | 0 |
| 9 | 1 | 1 | 1 | 0 | 4 |
| 10 | 1 | 1 | 1 | 1 | 6 |

| No. | BIT SEQUENCE | | | | | LEVEL |
|---|---|---|---|---|---|---|
| 1 | 0 | 0 | 0 | 0 | 0 | -6 |
| 2 | 0 | 0 | 0 | 0 | 1 | -4 |
| 3 | 0 | 0 | 0 | 1 | 1 | 0 |
| 4 | 0 | 0 | 1 | 1 | 0 | 2 |
| 5 | 0 | 0 | 1 | 1 | 1 | 4 |
| 6 | 0 | 1 | 0 | 0 | 1 | -2 |
| 7 | 0 | 1 | 1 | 0 | 0 | 0 |
| 8 | 0 | 1 | 1 | 1 | 0 | 4 |
| 9 | 0 | 1 | 1 | 1 | 1 | 6 |
| 10 | 1 | 0 | 0 | 0 | 0 | -6 |
| 11 | 1 | 0 | 0 | 0 | 1 | -4 |
| 12 | 1 | 0 | 0 | 1 | 1 | 0 |
| 13 | 1 | 0 | 1 | 1 | 0 | 2 |
| 14 | 1 | 1 | 0 | 0 | 0 | -4 |
| 15 | 1 | 1 | 0 | 0 | 1 | -2 |
| 16 | 1 | 1 | 1 | 0 | 0 | 0 |
| 17 | 1 | 1 | 1 | 1 | 0 | 4 |
| 18 | 1 | 1 | 1 | 1 | 1 | 6 |

| ITEM | PR(1,2,2,1) | PR(0,1,2,2,1) |
|---|---|---|
| CONSTRAINT LENGTH | 4 | 5 |
| NUMBER OF BIT SEQUENCES | 10 | 18 |
| NUMBER OF STATES | 5 | 9 |
| NUMBER OF LEVELS | 7 | 7 |
| SAMPLING | EDGE SYNCHRONOUS | EDGE ASYNCHRONOUS |
| PHASE ADJUSTMENT BY FIR FILTER | NOT REQUIRED | REQUIRED |
| NUMBER OF EFFECTIVE TAPS OF FIR FILTER | NUMBER OF IMPLEMENTATIONS | NUMBER OF IMPLEMENTATIONS-1 |

OPTICAL DISC APPARATUS WITH ADJUSTABLE CONSTRAINT LENGTH PRML

CLAIM OF PRIORITY

The present application claims priority from Japanese application JP 2004-306320 filed on Oct. 21, 2004, the content of which is hereby incorporated by reference into this application.

CROSS REFERENCE TO RELATED APPLICATION

U.S. patent application Ser. No. 10/774,587 is a co-pending application of this application. The content of which is incorporated herein by cross-reference.

BACKGROUND OF THE INVENTION

1. Field of the Invention

The present invention relates to an optical disc apparatus for recording information by forming a recording mark on a recording medium with a different physical property from that of the other portions of the medium.

2. Description of Related Art

With optical discs such as CDs and DVDs in widespread use, and with the development of the next-generation optical discs utilizing blue laser being well underway, there is a continuing demand for greater capacities. Optical disc products are now available that play back not just CDs but also DVDs and capable of recording a CD-R/RW, DVD-RAM, and DVD-R/RW on a single unit. Thus, there is also the need to improve the read/write compatibility for optical discs with different standards.

PRML (Partial Response Maximum Likelihood) is a widely used technique for increasing the capacity of magnetic discs, as it has an outstanding effect on improving S/N ratios. It continuously compares a read signal at time N and a target signal and binarizes the read signal into a most feasible bit sequence. Viterbi decoding, which is one of the ML schemes, is in wide practical use due to its ability to significantly reduce circuit size. Although a direct slice method has long been used as an optical disc read method, its limitations in achieving greater speed and capacity are obvious. Thus, PRML is also increasingly being applied as an optical disc read means.

In PRML, a target signal with a temporal transition that is closest to the read signal is selected, and the bit sequence that generates the target signal is outputted as the decoding result. The target signal is calculated by the convolution of a designated impulse response (PR class) and the bit sequence. Therefore, it is necessary to select an appropriate PR class depending on the recording density.

Meanwhile, modern optical disc apparatuses are being asked to be capable of recording and reading optical discs with different densities or formats.

For instance, in the case of Blu-ray Disc, products of recorders with recording capacity of 23.3 GB are now available, and it is expected that optical disc apparatuses accommodating 25 GB/27 GB will follow suit. These greater capacities are realized by improvements in terms of bits per inch, and capacities exceeding 30 GB are within reach in the future.

The following are more specific descriptions of the suitable PR class for the optical disc apparatuses of each generation accommodating each capacity of the Blu-ray Disc:

(1) First generation (accommodating 23.3 GB): PR(1,2,1)
(2) Second generation (accommodating 25 GB): PR(1,2,2,1)
(3) Third generation (accommodating 27 GB): PR(1,2,2,2,1)
(4) Fourth generation (accommodating 30 GB): PR(1,2,2,2,2,1)
(5) . . .

For instance, a third-generation optical disc apparatus is naturally desired to be capable of recording and reading media of 23.3 GB and 25 GB.

A technology to enable signals with different recording densities to be read using an optimum PR class is disclosed in JP Patent Publication (Kokai) No. 11-328860 A (1998) (corresponding to U.S. Pat. No. 6,333,907), whereby a plurality of Viterbi decoders are implemented and switched depending on recording density.

Another technology is disclosed in JP Patent Publication (Kokai) No. 10-106161 A (1998), whereby the tap coefficients of a FIR filter and a target level (recognition level) of a Viterbi decoder are determined as parameters based on a given value of inter-symbol interference of the read signal.

JP Patent Publication (Kokai) No. 10-334605 A (1998) discloses that different types of Viterbi decoding are implemented by switching the phase or the like when locking the PLL, such that a Viterbi decoding scheme more suitable for the characteristics of the read signal can be selected depending on the recording density.

Further, JP Patent Publication (Kokai) No. 11-296987 A (1999) discloses that the target signal level of a Viterbi decoder is caused to adaptively track the level of the read signal.

These technologies allow the Viterbi decoder to be physically or in effect switched for optimum read performance depending on the media with different recording densities.

Various technologies regarding the clock generation mechanism have also been disclosed which accommodate different recording densities.

FIG. 2 shows a diagram of a conventional PRML signal processing system. The PRML signal processing system operates with reference to a clock signal synchronized with the clock of the read signal, and so it employs a PLL (phase-locked loop) for synchronizing the clock of the signal processing system with the phase of the read signal. While there are a variety of PLL systems, when PLL is implemented following an ADC (analog-to-digital converter), as shown in FIG. 2, a digital PLL is generally employed that utilizes a digital phase comparator. Detailed description of the structure and operation of such PLL is omitted.

In a PLL, the phase comparator compares the phase between an input signal and a signal from its own VCO (voltage controlled oscillator). FIG. 3 shows the operational principle of a phase comparator of the 3-time scheme, where an n-time scheme means that values at n times including the current time at intervals T are used, T being the sampling interval in ADC, namely, the inverse of the clock frequency. Now, a read signal with no asymmetry and no direct-current offset is considered, and the central value of its envelope curve is defined as the reference signal level, namely, zero. In the case of the 3-time scheme, when the signs of x(n) and x(n−2) in a read signal sequence {x(n), x(n−1), x(n−2)} are different, this means that the O-level is being intersected in what is referred to as an "edge." The value of x(n) is the value of the read signal sampled at time n. Similarly, in a 2-time scheme, the case where the signs of x(n) and x(n−1) are different indicates an edge. When the phase of the PLL and that of the input signal are completely aligned, the input signal prior to ADC is considered to intersect the 0-level at time (n−1)T, as shown in the drawing for the case with no phase difference. In that case, the values of time nT and (n−2)T of the edge signal sequence have the same absolute values with different signs. It is assumed in the illustrated example that these values were {−1, 0, 1}. If the phase of the clock signal were to advance, namely, if the phase of the input signal were to lag behind that of the clock signal by time ΔT, the input signal prior to ADC would have the trajectory indicated by the solid line in the figure. If this were to be sampled by ADC at each time, the absolute values at times nT and (n−2)T would be mutually different, or {−0.7, 0.3, 1.3} in the illustrated example. Conversely, by utilizing the value of each point of an edge, the phase difference between the read signal and the clock can be detected. By further determining whether the edge is a rise edge or a fall edge, a value φ proportional to the phase difference can be obtained. In the case of the 3-time scheme, the value φ can be obtained by the following equation, for example:

$$\Phi = Sgn(x(n))\{x(n)+x(n-1)+x(n-2)\} \quad \text{(Eq. 1)}$$

Similarly, for the 2-time scheme, the value can be determined by the following equation:

$$\Phi = Sgn(x(n))\{x(n)+x(n-1)\} \quad \text{(Eq. 2)}$$

where $$Sgn(x) = \begin{cases} 1 & (x > 0) \\ 0 & (x = 0) \\ -1 & (x < 0) \end{cases} \quad \text{(Eq. 3)}$$

The detection of an edge is carried out by monitoring the transition of the sign of the sampled value between the interval of the two or three times.

The aforementioned methods of detecting the phase difference have the problems that, if the recording density increases as mentioned above and if the amplitude (resolution) of a minimum run-length signal significantly decreases, the clock accuracy decreases or an accurate edge detection is prevented.

In order to solve the instability of the PLL caused by the decrease in the amplitude of the minimum run-length signal, a means for tentatively determining the sign can be inserted preceding the PLL, as disclosed in JP Patent Publication (Kokai) Nos. 2002-175673 A (corresponding to U.S. Patent Publication No. 2002-071194) and 10-172250 A (1998). It is also possible to carry out the phase detection at a target level other than the O-level, as disclosed in JP patent Publication (Kokai) No. 2000-182335 A.

Patent Document 1: JP Patent Publication (Kokai) No. 11-328860 A (1999)
Patent Document 2: JP Patent Publication (Kokai) No. 10-106161 A (1998)
Patent Document 3: JP Patent Publication (Kokai) No. 10-334605 A (1998)
Patent Document 4: JP Patent Publication (Kokai) No. 11-296987 A (1999)
Patent Document 5: JP Patent Publication (Kokai) No. 2002-175673 A
Patent Document 6: JP Patent Publication (Kokai) No. 10-172250 A (1998)
Patent Document 7: JP Patent Publication (Kokai) No. 2000-182335 A

SUMMARY OF THE INVENTION

Since the optical disc is a medium-replaceable storage system, a disc that has been recorded on a certain drive must be capable of being played back on another drive. In order to guarantee this, the same location (a sector or a block) is read after recording to make sure that it can be read correctly. At the same time, the error correction rate of the ECC (error correction code) is monitored, and, if corrections corresponding to approximately 50% or more of the maximum error correction capability are detected, a recording error is reported or a rewriting is carried out. These processes are referred to as verification or RAW (read after write). The margin in the error correction capability is taken so as to ensure read compatibility with other drives. In CDs and DVDs, because binarization can be performed by the direct slice method, there is no difference in the performance of the binarizing unit. As a result, read compatibility problems have been avoided by the aforementioned margin in the error correction capability. In the case of Blu-ray Discs, however, binarization by the PRML scheme is virtually essential. Thus, if the difference in performance of the binarizing unit exceeds the error correction performance margin, this could lead to a failure to ensure the read compatibility. If that happens, trust in the whole system in the market could potentially be lost.

The conventional method as disclosed in JP Patent Publication (Kokai) No. 11-328860 A (1999) whereby a plurality of Viterbi decoders are implemented is not practical because the circuit size increases as the generation advances. The technologies disclosed in JP Patent Publication (Kokai) Nos. 10-106161 A (1998), 10-334605 A (1998), and 11-296987 A (1999) are designed to enhance the read capacity of the relevant drive units and they are not capable of emulating the PR(1,2,1) with the class bit number of 3 in units with the class bit number of 5, for example.

With regard to the PLL, a technology is required that provides for a stable supply of clock in accordance with a change in recording density. The conventional methods disclosed in JP Patent Publication (Kokai) Nos. 2002-175673 A and 10-172250 A (1998) lead to new problems that the size of circuits, which are complex and required to operate at high speed, increases, and that the phase margin of the PLL becomes narrowed due to the delay in the circuits. The method of JP Patent Publication (Kokai) No. 2000-182335 A is complex in structure and requires high-speed operations and leads to an increase in circuit sizes, for example.

Thus, the invention has the following two objects:
(Object 1) Ensure read compatibility by realizing a Viterbi decoding with a short effective constraint length upon verification in a Viterbi decoder implementing a PR class with a long constraint length accommodating high densities.
(Object 2) Realize a stable clock supply even if the resolution of the minimum run-length signal changes, and even becomes zero, in accordance with a change in recording density, while providing a PLL with a small-sized circuit configuration.

Initially, the results of an analysis will be described. In order to quantify the difference in binarization performance depending on the PR class, an experiment and a simulation were carried out. The optical disc prepared comprised a substrate with a land-groove structure with a track pitch of 0.34 μm, on which a phase-change film was laminated. The experiment employed a DDU-1000 optical disc evaluation apparatus manufactured by Pulstech Industrial Co., Ltd. The light source had a wavelength of 405 nm, and the NA of the objective lens was 0.85. The modulation code employed RLL(1,7). The detection window width Tw was varied from 53 nm to 80 nm.

In order to analyze the difference in binarization performance due to the PR class, the read bit error rate was measured for the PR(1,2, . . . ,2,1) sequence, such as PR(1,2,1), PR(1,2,2,1), . . . , as mentioned above.

FIG. 4 shows the results of measurement showing the relationship between the recording capacity and the bit error rate for the PR(1,2, . . . , 2,1) sequence. The results showed that in this sequence, the bit error rate decreases as the class bit number (constraint length) increases up to 5, but as the class bit number becomes 6 or greater, the bit error rate increases. The reduction in read performance is believed due to the fact that, when the class bit number is too large, the number of independent target levels increases such that the effective difference in the Euclidean distance between two paths becomes small, resulting in a smaller margin for asymmetry or amplitude fluctuations in the read signal, for example. Since these experimental results show that the bit error rate becomes smaller than $10^{-6}$, the difference in binarization performance between PR(1,2,1), PR(1,2,2,1), and PR(1,2,2,2,1) at the capacity of 23.3 GB, for example, could not be quantified. Thus, the difference in bit error rate was evaluated by simulation, focusing on these.

FIG. 5 shows the results of a simulation showing the relationship between recording capacity and bit error rate for the PR(1,2, . . . , 2,1) sequence. As shown, it was learned that the bit error rate for a disc with a recording capacity of 23.3 GB was $3 \times 10^{-5}$ in the case of PR(1,2,1), whereas the bit error rate in the cases of PR(1,2,2,1) and PR(1,2,2,2,1) was $10^{-7}$ or lower, resulting in a difference by more than 100 orders of magnitude. This means that, in accordance with the foregoing example, there is more than 100 times of difference in binarization performance between an optical disc apparatus adapted to the 23.3-27 GB capacities and implementing PR(1,2,2,2,1) and an optical disc apparatus adapted to the 23.3 GB capacity and implementing PR(1,2,1). Such a difference far exceeds the margin (approx. two times) of the error correction capability of ECC. It was therefore learned that, unless an appropriate verification is performed, there is the high possibility of a read error in initial-generation optical disc apparatuses implementing PR(1,2,1) even if verification is correctly completed with a leeway in an optical disc apparatus implementing PR(1,2,2,2,1).

It was also learned that, once the capacity of 30 GB or more is realized in Blu-ray Disc, resolution becomes zero and the following problems would arise. Specifically, not only does the read signal from the optical disc include various kinds of noise, but also the DC component may in some cases vary locally depending on the recording pattern. For this reason, when the read signal continues to be near the 0-level, it is possible that the 0-level is crossed regardless of the actual mark or space edge (development of a false edge). FIG. 6 schematically shows an example of such a false edge. An input signal is assumed to consist of a succession of 2T marks and spaces, and the position of the original edge is represented by a vertical solid line. The sampled input signal is represented by a small circle. The situation at time 3T would be identified as an edge by the simple phase comparator of the 3-time scheme earlier described, which would then output a signal that is totally irrelevant to the actual phase difference. As a result, the synchronization accuracy with respect to the read signal could possibly decrease, or synchronization might even be lost, resulting in a poor error rate.

Similar problems also arise, for reasons of design, in systems that are capable of sufficiently resolving 2T signals, depending on circumstances. For instance, if the focal point or the spherical aberration-correcting optical system are not sufficiently adjusted, the resolution of the optical system drops and the same situation as mentioned above would result. The same situation may also occur when the signal-to-noise ratio is small.

It is noted that since the discussion herein is centered around Viterbi decoders with a minimum run-length of 2T as used in Blu-ray Disc, the minimum run-length is 2T unless otherwise specified. Further, since the invention is mainly concerned with signals after A/D conversion, the term "input signal" referred to hereafter will refer to data after A/D conversion unless otherwise specified; it all depends on context, however.

Hereafter, means for achieving Object 1 will be described.

In order to effectively change the constraint length for verification purposes, a Viterbi decoder with an adjustable target level is employed. FIG. 7 shows the structure of a target level-adjustable Viterbi decoder. A decode unit 10 comprises an analog equalizer 11, an A/D converter 12, an FIR filter 13, a branch metric calculation unit 14, an ACS (Add Compare Select) unit 15, a path memory 16, and a target level table 17. A read signal 50 is equalized and low-pass filtered by the analog equalizer 11 and then converted into a digital value by the A/D converter 12. The digital value is digitally equalized by the FIR filter 13 whose output is fed to the branch metric calculation unit 14, which calculates a squared error value (branch metric value) for each bit sequence with respect to a target level. The target level is designated by the target level table 17. In the ACS unit 15, a branch metric value corresponding to each bit sequence is added to a state metric value in a state 1-time earlier and in each state (the state metric value being obtained by sequentially adding up the branch metric value along with the transition of the state which is processed such that there is no divergence). In this step, a transition process with a smaller state metric value is selected out of the transition processes (there are normally two of them; there may be only one in some cases due to the run-length limitation) leading to the current time. The "state" herein refers to the bit sequence that is stored for a transition at one point in time. For example, in the case of a PR class with the constraint length of 4, the bit sequence is represented by 4 bits and the state by 3 bits. In the path memory 16, there are stored the binarization results for a sufficiently long period of time that are combined for each bit sequence. The ACS unit 15 rearranges the information stored in the path memory depending on the result of selection of the state metric value, during the transition process selection process. By repeating these processes, the information in the path memory gradually becomes integrated, and after a sufficiently long period of time, the values become identical regardless of the bit sequence, thereby completing the so-called path merging. The result of binarization 51 is binary information obtained at the end of the path memory at each time. In the target level table 17, a target level value for each preset bit sequence is set in response to a preset value setting instruction 53 from CPU, which is not shown.

In this structure, by varying the target level value that is set in the target level table, a Viterbi decoder with an effectively variable constraint length can be realized.

In the following, a method of effectively realizing PR(1,2,1) and PR(1,2,2,1) will be described with reference to a Viterbi decoder with a variable target level implementing the PR(1,2,2,2,1) class with a constraint length of 5 as an example.

FIG. 8 shows a summary of the target levels for each of the bit sequences of PR(1,2,1) class. FIG. 9 shows a summary of the target levels for each of the bit sequences of PR(1,2,2,2,1) class. The following discusses newly defining a PR(0,0,1,2,1) class in order to effectively realize PR(1,2,1) using a Viterbi decoder with the constraint length of 5.

FIG. 10 shows a summary of the target levels for each of the bit sequences of the PR(0,0,1,2,1) class. As shown in the figure, when the two bits to the left of the bit sequences are ignored, the target signal levels that are determined by the remaining three bits can be made identical to those of PR(1,2,1) shown in FIG. 8. The number of the bit sequences, however, is the same as that of PR(1,2,2,2,1) shown in FIG. 9. Therefore, PR(0,0,1,2,1) operates as a PR(1,2,1) with the constraint length of 5.

FIG. 11 shows the result of simulation of the relationship between recording capacity and bit error rate for PR(0,0,1,2, 1) and PR(1,2,1). As shown, in a region with a bit error rate of $10^{-4}$ or smaller (where error correction is possible), the difference between the two is sufficiently small that the difference due to the constraint length can be ignored for all practical purposes. Thus, PR(0,0,1,2,1) can be used for the verification process to ensure read compatibility, which is one of the objects of the invention.

FIG. 12 shows a summary of the difference between PR(1, 2,1) and PR(0,0, 1,2,1).

If PR(1,2,2,1) is to be effectively realized, PR(0,1,2,2,1) may be used as described above. FIG. 13 shows a summary of the target levels for each of the bit sequences of the PR(1,2, 2,1) class. FIG. 14 shows a summary of the target levels for each of the bit sequences of the PR(0,1,2,2,1) class. FIG. 15 shows a summary of the difference between PR(1,2,2,1) and PR(0,1,2,2,1). It should be noted here that in cases of classes where the constraint length is an odd number, the sampling point (clock edge) must be shifted by ½ of the clock cycle with respect to the data edge. On the other hand, for those classes with an even-numbered constraint length, the data edge and the sampling point must be synchronized. In the case of PR(0,1,2,2,1) with the constraint length of 5, since the target signal level is identical to that of PR(1,2,2,1) with an even-numbered constraint length, data is required that is synchronized with the data edge. In order to address this need, besides inverting the polarity of the PLL clock, an FIR filter may be employed to perform an equalization with a phase shift of ½ of the clock cycle. In the former case, an increase in circuit sizes, though small, is inevitable, whereas in the latter case, the tap coefficients of the FIR filter only needs to be properly set. In order to allow the waveform to be phase-shifted by approximately ½ of the clock cycle using an FIR filter, it is only necessary to set the effective tap number to be an even number and to make the tap coefficients to be horizontally symmetrical. In a simple example, when the tap number of the FIR filter is 3, the coefficient sequence may be made (0.5, 0.5, 0) for realizing the aforementioned phase shift. In this case, it is necessary to make the coefficient at one or the other end zero, thereby effectively reducing the tap number of the FIR filter by 1. The decrease in the tap number by one, however, should have only a sufficiently small amount of influence, for such a measure is taken only when data of low density is recorded and verified in an optical disc apparatus equipped with an FIR filter already accommodating high densities.

Thus, Object 1 of the invention can be achieved by making the target signal level, such as PR(0,0, 1,2,1), equal to that of the lower-level system while retaining the same constraint length in a target level-adjustable Viterbi decoder.

The foregoing has been the description of the means for achieving Object 1 of the invention.

Hereafter, means for achieving Object 2 of the invention will be described.

In case the resolution of the minimum run-length signal decrease, the operation of the PLL becomes destabilized by the effect of the false edge as described above. In order to solve this problem, a system may be employed such that the signal amplitude of the minimum run-length signal is read from the read signal so that the phase error amount would not be detected from the edge of signals with amplitudes below the thus read amplitude. At the same time, when the recording density is low and the resolution of the minimum run-length signal is sufficiently large, the operation of the PLL may be made more stable by detecting the phase error amount also from the edge of the minimum run-length signal. In order to accommodate this, the function for detecting the phase error amount from the aforementioned minimum run-length signal can be adapted to be selectively turned on or off, so that the function can be turned off for high density and on for low density. The above-described edge-determination by the phase comparator and the switching of the effective constraint length of the Viterbi decoder can be performed in accordance with the recording density, or a particular read or verification operation.

Thus Object 2 of the invention can be achieved.

As described above, the invention can achieve the two objects thereof and provide an optical disc apparatus implementing PRML that is capable of recording and reading a plurality of disc media with different recording densities and ensuring read compatibility between drives without relying solely on the error correction capacity of ECC.

In accordance with the optical disc apparatus of the invention, the aforementioned two objects can be achieved, whereby a plurality of disc media with different recording densities can be recorded and read and whereby read compatibility can be ensured.

BRIEF DESCRIPTION OF THE DRAWINGS

FIG. 8 shows target levels for each bit sequence of the PR(1,2,1) class in a summarized manner.

FIG. 9 shows target levels for each bit sequence of the PR(1,2,2,2,1) class in a summarized manner.

FIG. 10 shows target levels for each bit sequence of the PR(0,0,1,2,1) class in a summarized manner.

FIG. 12 shows the difference between PR(1,2,1) and PR(0, 0,1,2,1) in a summarized manner.

FIG. 13 shows target levels for each bit sequence of the PR(1,2,2,1) class in a summarized manner.

FIG. 14 shows target levels for each bit sequence of the PR(0,1,2,2,1) class in a summarized manner.

DESCRIPTION OF THE PREFERRED EMBODIMENTS

The invention will be hereafter described in greater detail by referring to embodiments thereof.

Embodiment 1

Figures 15, 16:
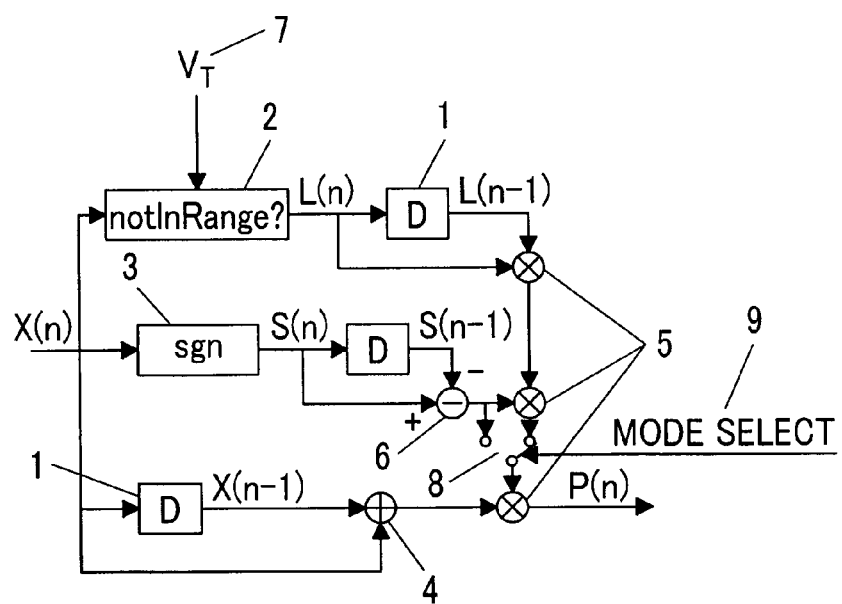
FIG. 15 shows the difference between PR(1,2,2,1) and PR(0,1,2,2,1) in a summarized manner.
FIG. 16 shows an embodiment illustrating the structure of a phase comparator of the 2-time scheme built inside a PLL circuit of the invention.

In the present embodiment, the structure of a PLL circuit will be described in concrete terms. FIG. 16 shows the structure of a phase comparator of the 2-time scheme built inside a PLL circuit of the invention. The structure is characterized in that the magnitude of the input signal at each time is also considered upon detection of an edge, while conventionally the phase comparator determines the edge solely from the sign of the input signal at two times. Namely, in order to avoid detecting an erroneous edge as described above with reference to the objects of the invention, the absolute values of the input signals x(n) and x(n−1) at two times are compared with a certain predetermined threshold value $V_T$, and an edge is recognized only when both exceed the threshold value. In other words, an additional condition $|x(n)|>V_T$ and $|x(n-1)|>V_T$ for an edge is provided.

The operation of the phase comparator shown In FIG. 16 will now be described. In this example, the sign and magnitude of the input signal at two times are determined In a parallel manner. For the determination regarding the magnitude of the input signal, a threshold determination unit 2 carries out the computations represented by Equation 4, and then outputs the result as a signal L(n).

$$L(n) = 0 \quad (|x(n)| \le V_T) \atop L(n) = 1 \quad (|x(n)| > V_T)} \quad \text{(Eq. 4)}$$

L(n) is inputted to a delay unit 1, which outputs at each clock the value that has been inputted previously while retaining the value that has been inputted at the current clock for the period of one clock. Namely, the delay unit 1 produces a delay corresponding to the period of 1T. When the outputs of the delay unit, namely, L(n−1) and L(n), are multiplied by a multiplying unit 5, the output of the multiplying unit 5 would be 1 only when the absolute values of x(n) and x(n−1) are both greater than the threshold value; otherwise, the output would be 0.

A sign determination unit 2 also outputs S(n) with respect to x(n) in accordance with the following equations:

$$S(n) = -1 \quad (|x(n)| < 0) \atop S(n) = 1 \quad (|x(n)| \ge 0)} \quad \text{(Eq. 5)}$$

S(n)=−1 (x(n)<0)) (Eq. 5) S(n)=1 (x(n)≧0)

S(n) is also fed to the delay unit. When the output of the delay unit S(n−1) is subtracted from S(n) in the subtraction unit 6, the output would be: +2 in the case of a rise edge zero-crossing from the negative side to the positive side; −2 in the case of a fall edge zero-crossing from the positive side to the negative side; and 0 in the case of no zero-crossing. By multiplying these outputs with the multiplier output in the threshold value determination system, an edge determination result incorporating the amplitude condition can be obtained. By further multiplying this result with x(n)+x(n−1), P(n) of a finite value proportional to the phase difference is outputted only when an edge has appeared that has a sufficient amplitude.

Still referring to FIG. 16, the operation of a switch 8 is controlled by a mode switching instruction 9 so that it can be determined whether a certain detection with respect to the threshold value is valid or not. The mode switching instruction is issued from the CPU, which is not shown.

Figure 17:
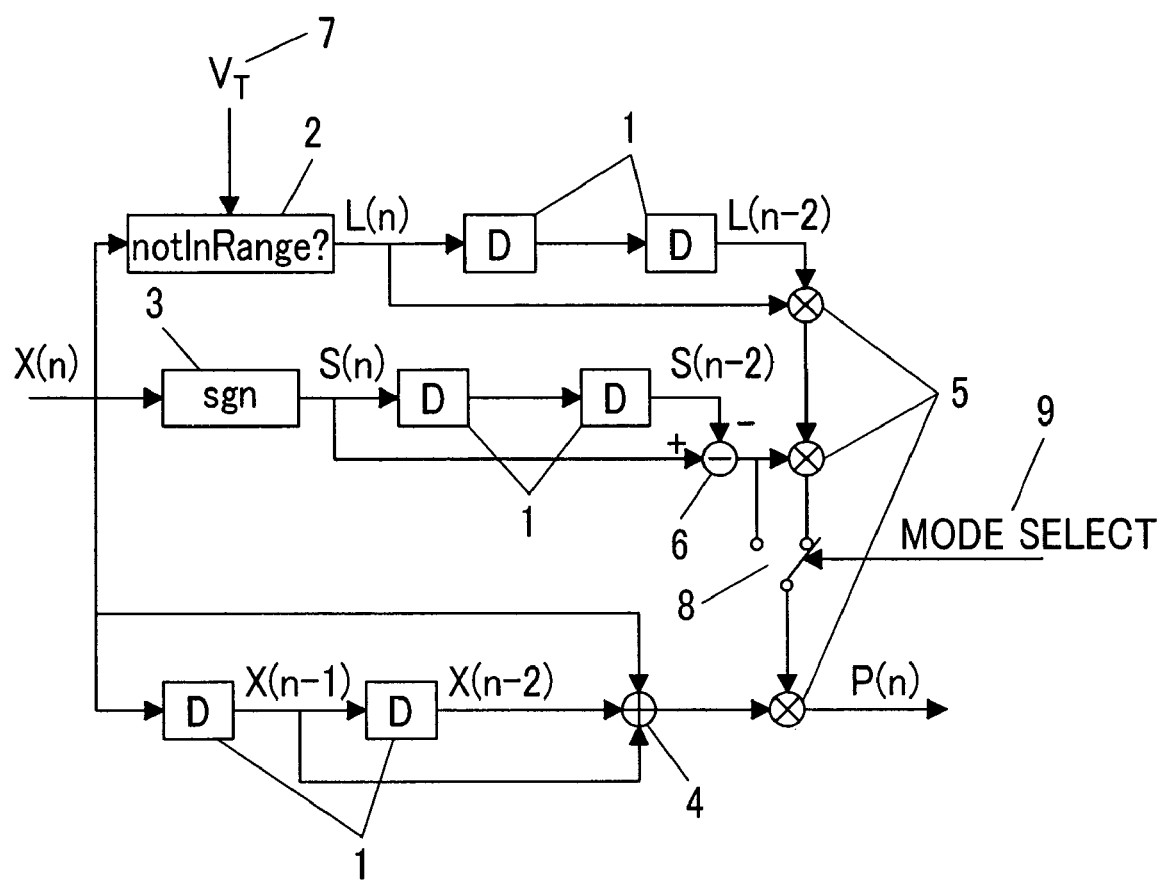
FIG. 17 shows an embodiment illustrating the structure of a phase comparator of the 3-time scheme built inside a PLL circuit of the invention.

FIG. 17 shows an example of the invention being applied to a phase comparator of the 3-time scheme. In this case, since x(n) and x(n−2) are used for edge determination, a required number of delay units are added to each of the code determination system and the threshold determination system of the configuration show in FIG. 16. Similarly, since x(n), x(n−1), and x(n−2) are used for the calculation of the phase difference, required delay units are added and also adders are added in accordance with the definition of the phase difference calculation. However, the operation of the illustrated example is similar to that of the 2-time scheme and therefore its detailed description is omitted.

In addition to the schemes shown in FIGS. 16 and 17, there may be a plurality of other schemes for determining an edge using the magnitude of the signal sequences of edge candidates. For example, in a variation, the product of S(n) and S(n−1) may be determined first and then the sign may be determined. Further, while in the examples of FIGS. 16 and 17 a single threshold value is employed, an edge determination may be performed using different threshold values for the positive and negative sides. This would be particularly effective for making a more accurate edge determination when there is asymmetry, which is often observed in the read signal from optical discs.

Figure 18:
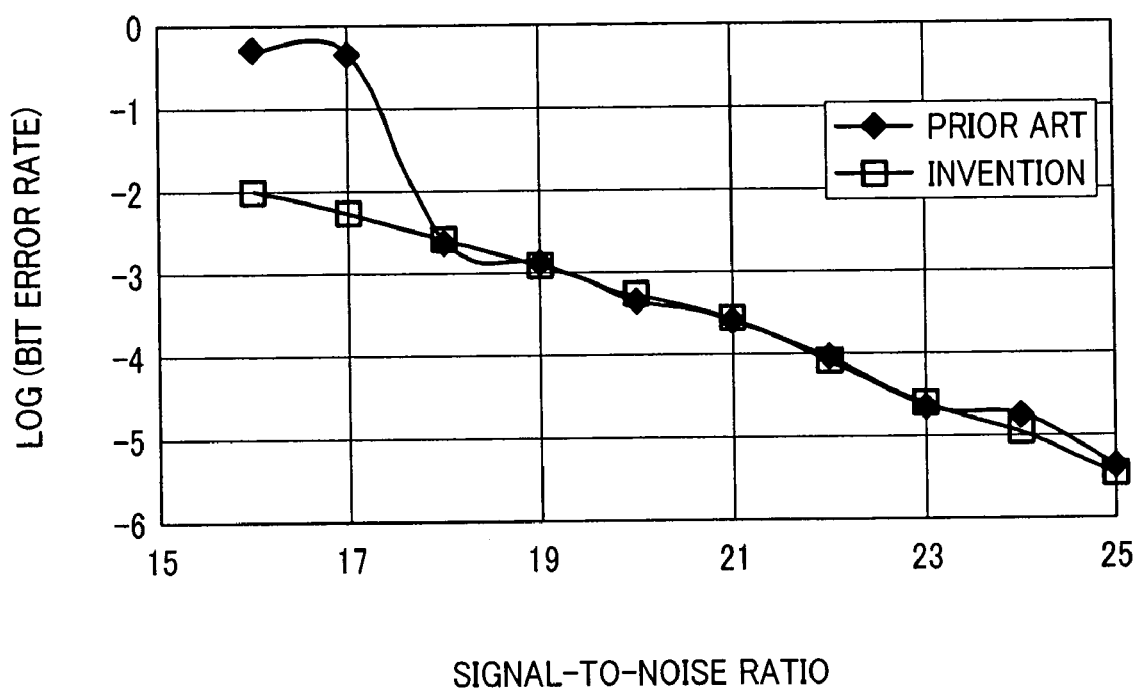
FIG. 18 shows the simulation results comparing the bit error rate between a PRML decoding system employing the PLL circuit of the invention and a conventional PRML decoding system.

FIG. 18 shows a comparison of performance between a PRML decoding system incorporating a PLL using the phase comparator shown in the present embodiment and a PRML decoding system incorporating a PLL using a conventional phase comparator, in terms of bit error rate calculated by simulation. The bit error rate was calculated by the signal processing of a pseudo-waveform generated based on a step response obtained by optical simulation. Table 1 shows the various conditions used during the simulation.

TABLE 1

| | |
|---|---|
| Wavelength of light source (nm) | 405 |
| Aperture ratio of objective lens | 0.65 |
| Rim strength | 0.6 |
| Disc reflectance (space) | 0.25 |
| Mark reflectance | 0.02 |
| Mark width (μm) | 0.18 |
| Track pitch (μm) | 0.34 |
| Groove width (μm) | 0.34 |
| Groove depth (nm) | 40 |
| Cover layer thickness (mm) | 0.6 |
| Channel bit length (nm) | 97.4 |
| Modulation scheme | 1-7 run length limited |
| PR class | PR(1, 1, 1, 1) |

Under these conditions, the resolution of 2T-length mark and space signals is on the order of 1% (with respect to a 8T-length signal). Therefore, the rate of erroneously determining an edge due to the influence of noise increases. When generating the pseudo-waveform by superposing the step response, a stress against the PLL was introduced by superposing the step response at intervals corresponding to a clock slower than the original channel clock by 1%. At the same time, white noise corresponding to amplifier noise was added. By varying the amplitude of the effective value of the white noise, the S/N ratio was adjusted, and, under this condition, the error ratio was determined, as plotted in the chart.

The chart shows that when the noise amplitude is sufficiently small, substantially identical error rates are obtained regardless of which phase comparator is used. However, in the decoding system employing the conventional phase comparator, the error rate drastically increases when the S/N ratio of the added noise drops to 17 dB or lower. Such an increase in the error ratio is due to the failure of the PLL to maintain synchronism. On the other hand, in the decoding system employing the phase comparator in accordance with the invention, such an increase in error rate does not occur, even when the noise is further increased by 2 dB, thus demonstrating the effectiveness of the present scheme.

Figure 2:
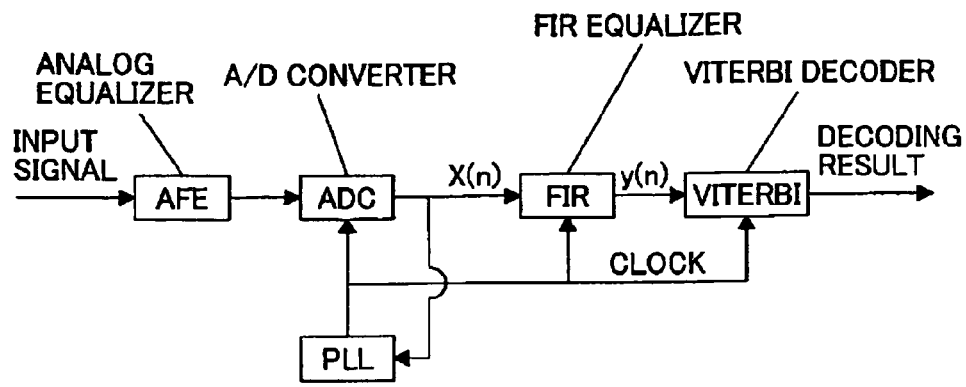
FIG. 2 shows a block diagram of a conventional PRML signal processing system.
Figure 3:
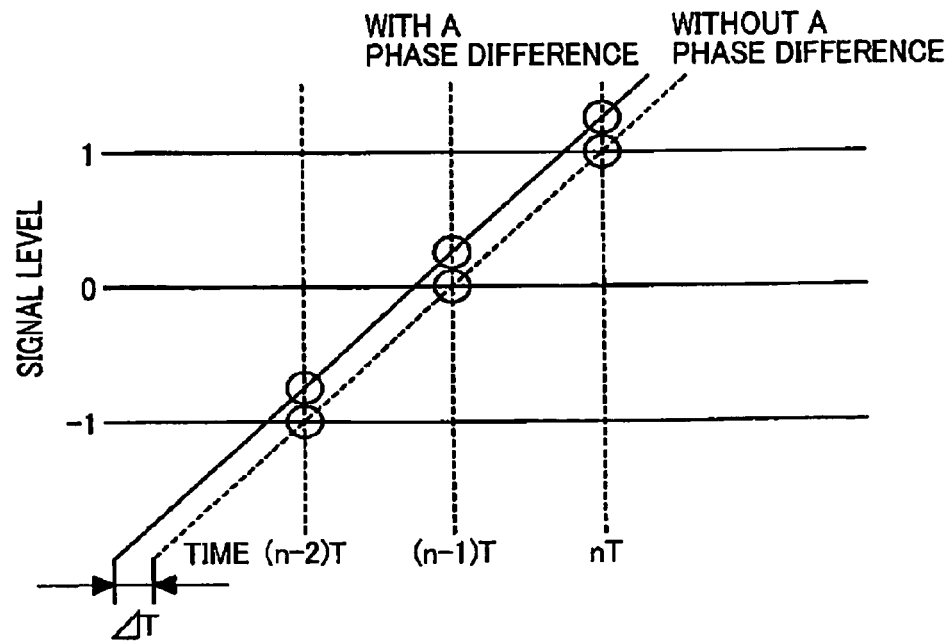
FIG. 3 shows the operating principle of a phase comparator of the 3-time scheme.
Figure 4:
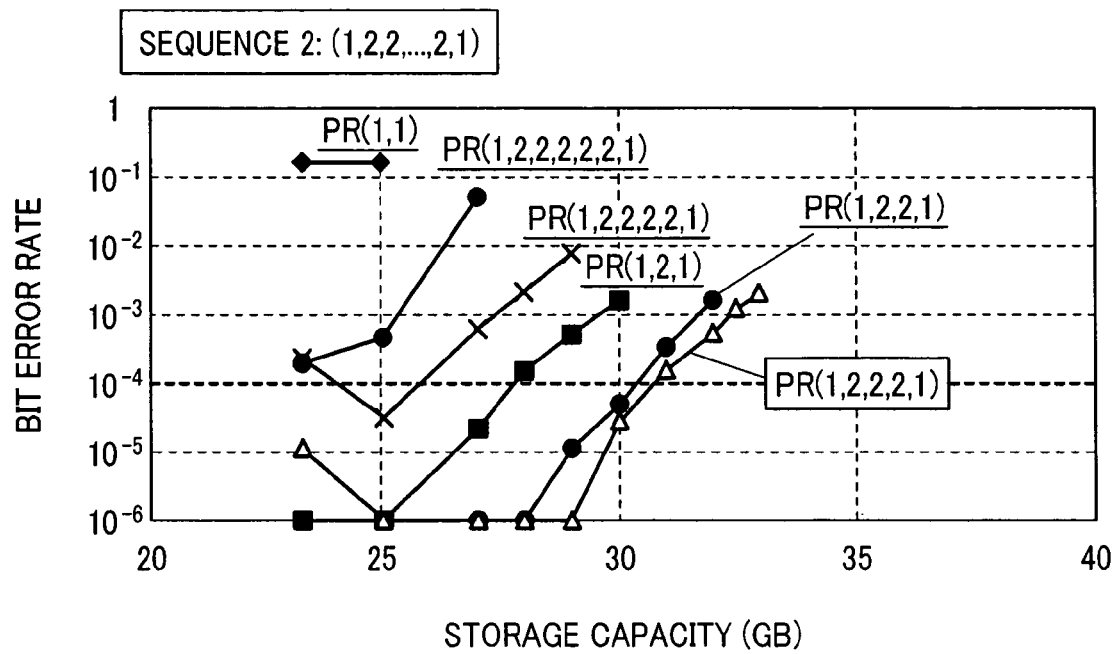
FIG. 4 shows measurement results indicating the relationship between recoding capacity and bit error rate with regard to the PR(1,2, ..., 2,1) sequence.
Figure 5:
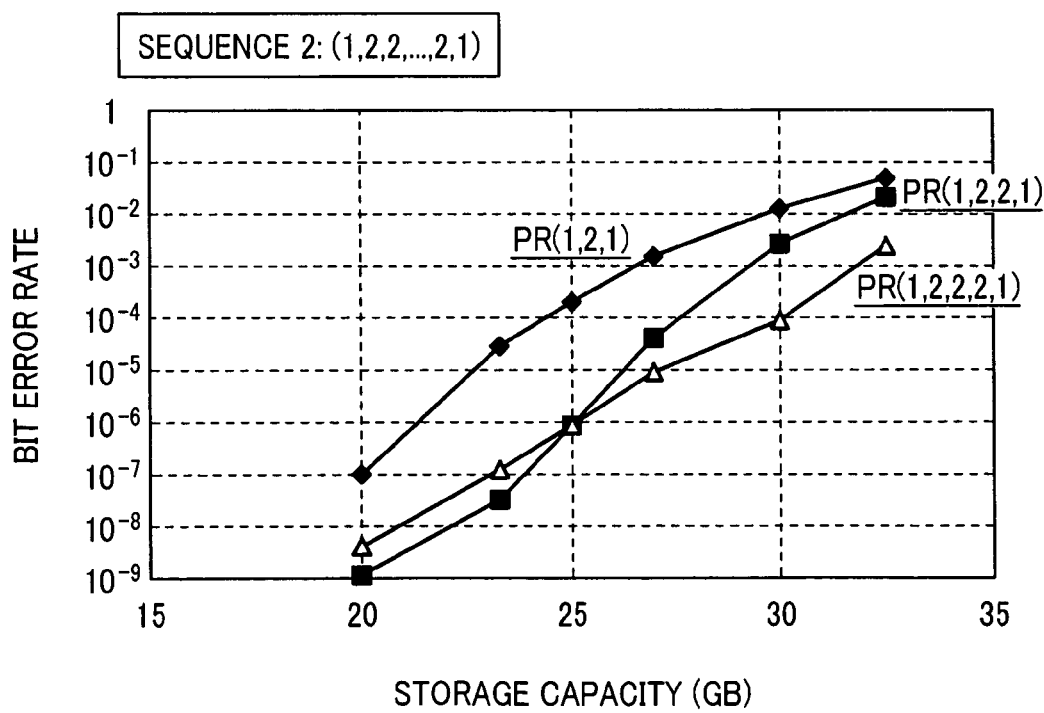
FIG. 5 shows simulation results indicating the relationship between recording capacity and bit error rate with regard to the PR(1,2, ..., 2,1) sequence.
Figure 6:
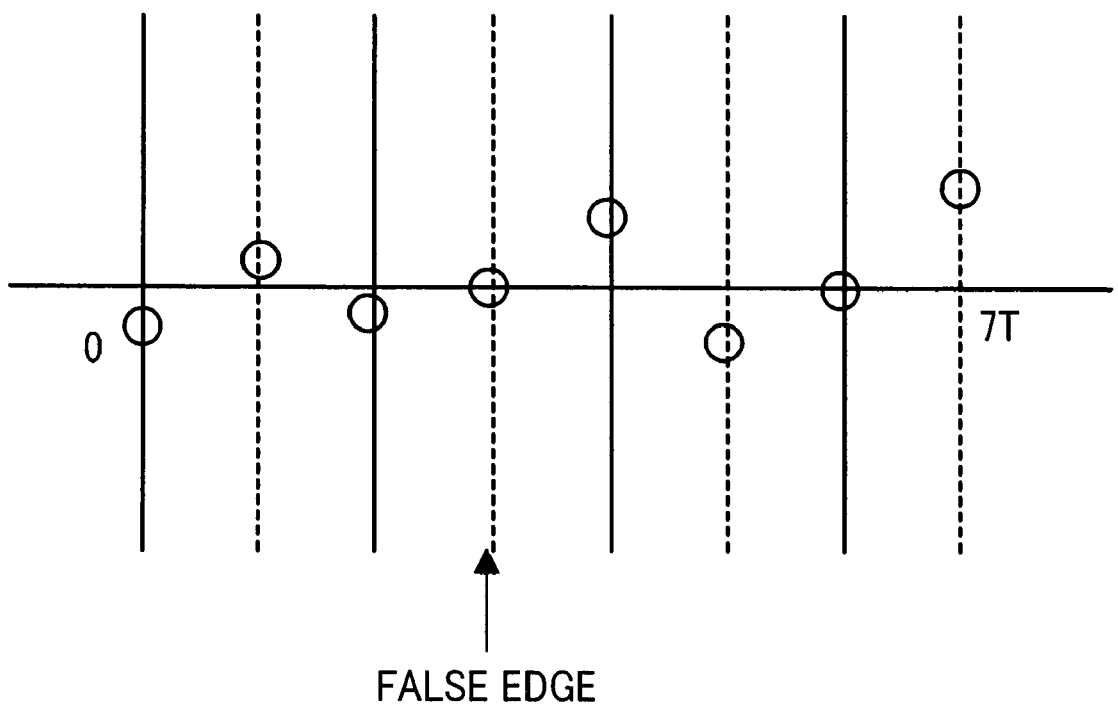
FIG. 6 schematically shows an example of an false edge.
Figure 19:
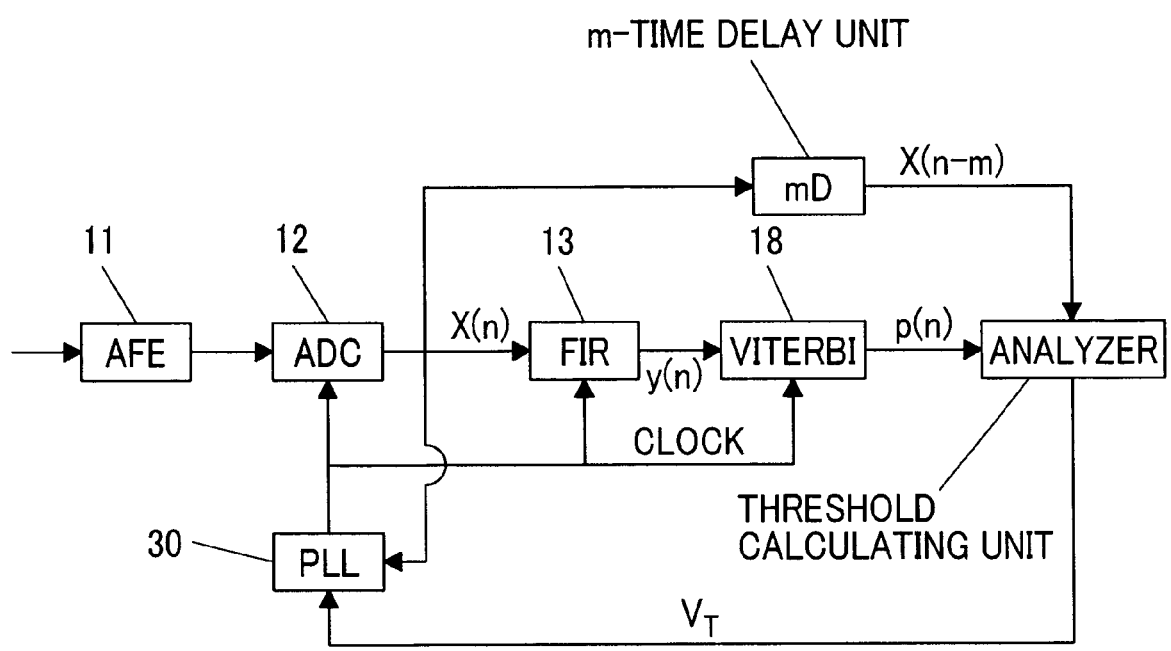
FIG. 19 shows an embodiment illustrating the structure of a Viterbi decoder with an automatically variable threshold in the PLL circuit of the invention.

In each of the above-described schemes, the threshold value VT necessary for edge determination must be determined in advance. This is effective when the details of the inputted signal are known in advance and variations over time are small. Although such a situation is extremely unusual in optical disc apparatuses in particular, in a combination with a PRML decoder, it is possible to automatically change the threshold value depending on the situation of the signal. An example is shown in FIG. 19, which is based on the PRML signal processing system of the conventional configuration shown in FIG. 2, which is further equipped with a threshold calculating unit 21. The threshold calculating unit 21 determines the threshold value by referring to the result of decoding by the PLL utilizing the phase comparator of the invention and the Viterbi decoder, and to the input signal level. The method for calculating the threshold value differs depending on the PR (partial response) class used and the modulation code of the signal sequence of interest. The basic concept, however, is that target levels that should not be considered to be an edge are designated, and input signal levels corresponding to such levels are compared with the result of the Viterbi decoder in order to determine the threshold value.

Hereafter, an example employing PR(1,2,2,1) will be described. The code modulation scheme is the 1-7 run length limited. Table 2 shows the correspondence between the bit pattern and the target values.

TABLE 2

| Bit sequence | Target level |
| --- | --- |
| 1111 | 3 |
| 1110 | 2 |
| 0111 | 2 |
| 0110 | 1 |
| 0011 | 0 |
| 1100 | 0 |
| 1001 | −1 |
| 1000 | −2 |
| 0001 | −2 |
| 0000 | −3 |

In these combinations, there are three kinds of target level sequences for the fall edge depending on the mark and space lengths, namely, {2,0,−2}, {2,0,−1}, and {1, 0, −1}, as summarized in Table 3.

TABLE 3

| | Mark | | |
| Space | 2 | 3 | 4 or more |
| --- | --- | --- | --- |
| 2 | {1, 0, −1} | {1, 0, −2} | {1, 0, −2} |
| 3 | {2, 0, −1} | {2, 0, −2} | {2, 0, −2} |
| 4 or more | {2, 0, −1} | {2, 0, −2} | {2, 0, −2} |

Figure 20:
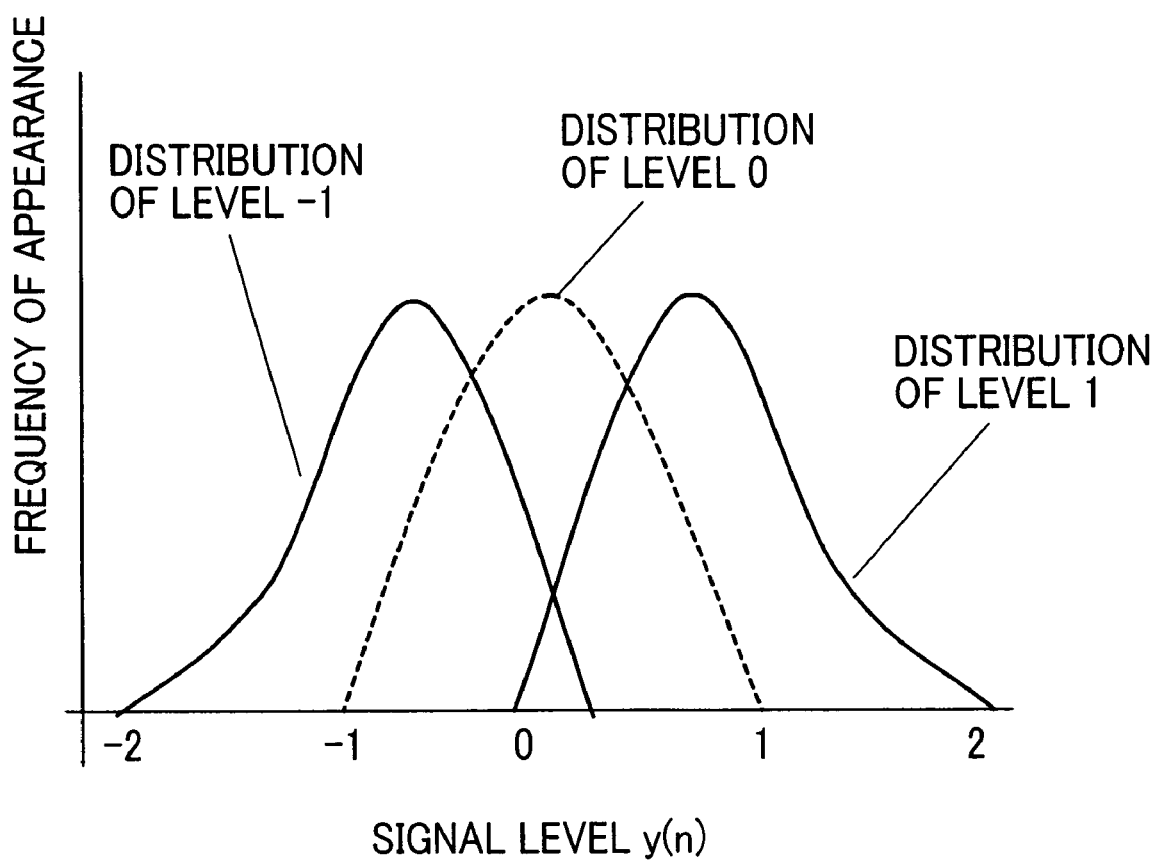
FIG. 20 schematically shows the distribution of the values of y(n) determined by the Viterbi decoder.

The above table is to be viewed that the space comes first. In a rise edge, a mark precedes and the signs in the table would be reversed. Since it is those signals from 2T marks or spaces that could be so small as to be unsuitable for edge detection, the threshold may be set such that edges related to the 2T marks and spaces can be eliminated as much as possible. As will be seen from Table 2, such edges include target levels 1 or −1. Therefore, the threshold value is determined using the value of y(n) determined by the Viterbi decoder as their levels. Because such a value of y(n) naturally exhibits a certain distribution as shown in FIG. 20, the threshold determining scheme may be arbitrary. In the present example, an arithmetic mean of the absolute values of the mean values of the signal levels that have been determined to be levels 1 and −1 is defined as the threshold value. One advantage of this scheme is that the threshold value can be determined from a relatively small number of data items, so that the scheme can be implemented in a small-sized circuit. When different threshold values are to be set for the positive and negative sides, individual mean values may naturally be employed. Other methods are also conceivable. For example, one method may employ the arithmetic mean of the absolute values of the signal levels at peak positions in the distribution of the level 1 and level −1. Another method may employ the arithmetic mean of a maximum value and a minimum value of each distribution of level 1 and level −11.

The operation of the apparatus shown in FIG. 19 will be described. For equalizing the input signal, an analog equalizer and an FIR (finite impulse response) equalizer are used. The input signal that has been passed through the analog equalizer is converted into a time-discrete digital signal sequence x(n) by an ADC. The digital signal sequence x(n) is supplied to PLL and produces a clock signal synchronized with the input signal. The sequence x(n) is also passed through the FIR equalizer and then fed to the Viterbi decoder as a signal sequence y(n). The Viterbi decoder decodes y(n) into a bit stream and outputs p(n) indicating the target level determined for each y(n). When p(n) agrees with each designated target level (1 and −1 in the present case), the threshold calculator determines a mean value of a corresponding input signal. In this step, the input signal sequence is delayed in an m-time delay unit 106 by an amount equal to the delay (mT) that is produced by the FIR equalizer and the Viterbi decoder.

The threshold value has an initial value at the start of operation. The initial value may be arbitrarily given. The threshold value is updated automatically. Specifically, the number of the data items that are used for calculating the threshold value is designated, and when a designated number is exceeded with the passage of time, old data is discarded and newly acquired data is incorporated into the calculation. Naturally, the threshold value-updating operation can be terminated or re-initialized as needed. It is also possible to limit the range of values the threshold value is allowed to take so as to prevent the absolute value of the threshold value from becoming too large for one reason or another.

Figure 21:
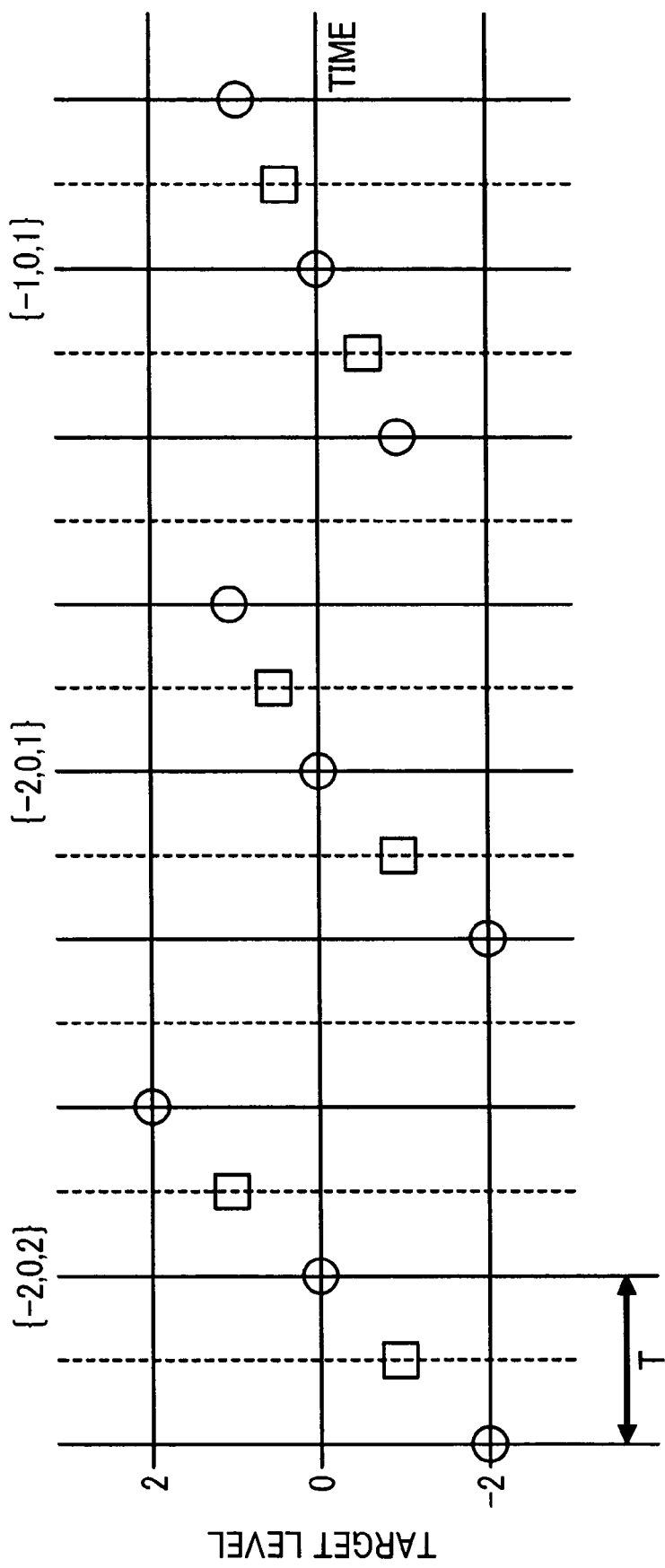
FIG. 21 shows an embodiment illustrating the difference between the 2-time scheme and the 3-time scheme of the phase comparator build inside the PLL of the invention.

In the case of the phase comparator of the 2-time scheme, the ADC sampling timing corresponds to the intermediate point of the clock. FIG. 21 shows a comparison with the 3-time scheme in the case of PR(1,2,2,1). The vertical solid lines represent the clock position of the read signal. The circles correspond to the 3-time scheme and the squares to the 2-time scheme. As will be seen from the drawing, the edge represented as {−2, 0, 2} in target levels by the 3-time scheme correspond to {−1, 1}. Similarly, the edge {−2, 0, 1} represented by the 3-time scheme, if it were to be represented in terms of target levels, would correspond to {−1, 0.5}, and {−1, 0, 1} would correspond to {−0.5, 0.5}. Thus, it will be seen that, most simply, a value that is ½ of the threshold value determined by the same method as that for the 3-time scheme may be adopted.

Figure 22:
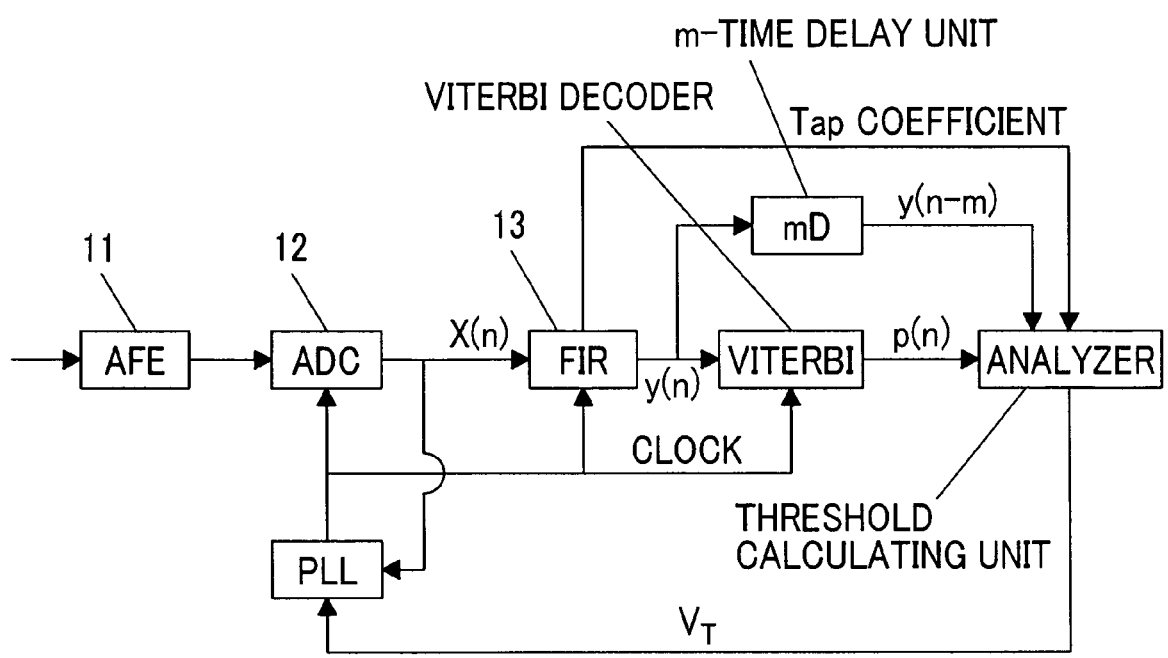
FIG. 22 shows an embodiment illustrating the structure of a Viterbi decoder employing the PLL of the invention.

FIG. 22 shows the diagram of an example of a Viterbi decoder implementing the PLL of the invention. In this example too, the threshold value can be automatically varied depending on the situation of the read signal, and it differs from the one shown in FIG. 19 in that a phase error detection is carried out according to the 3-time scheme.

Embodiment 2

Figure 1:
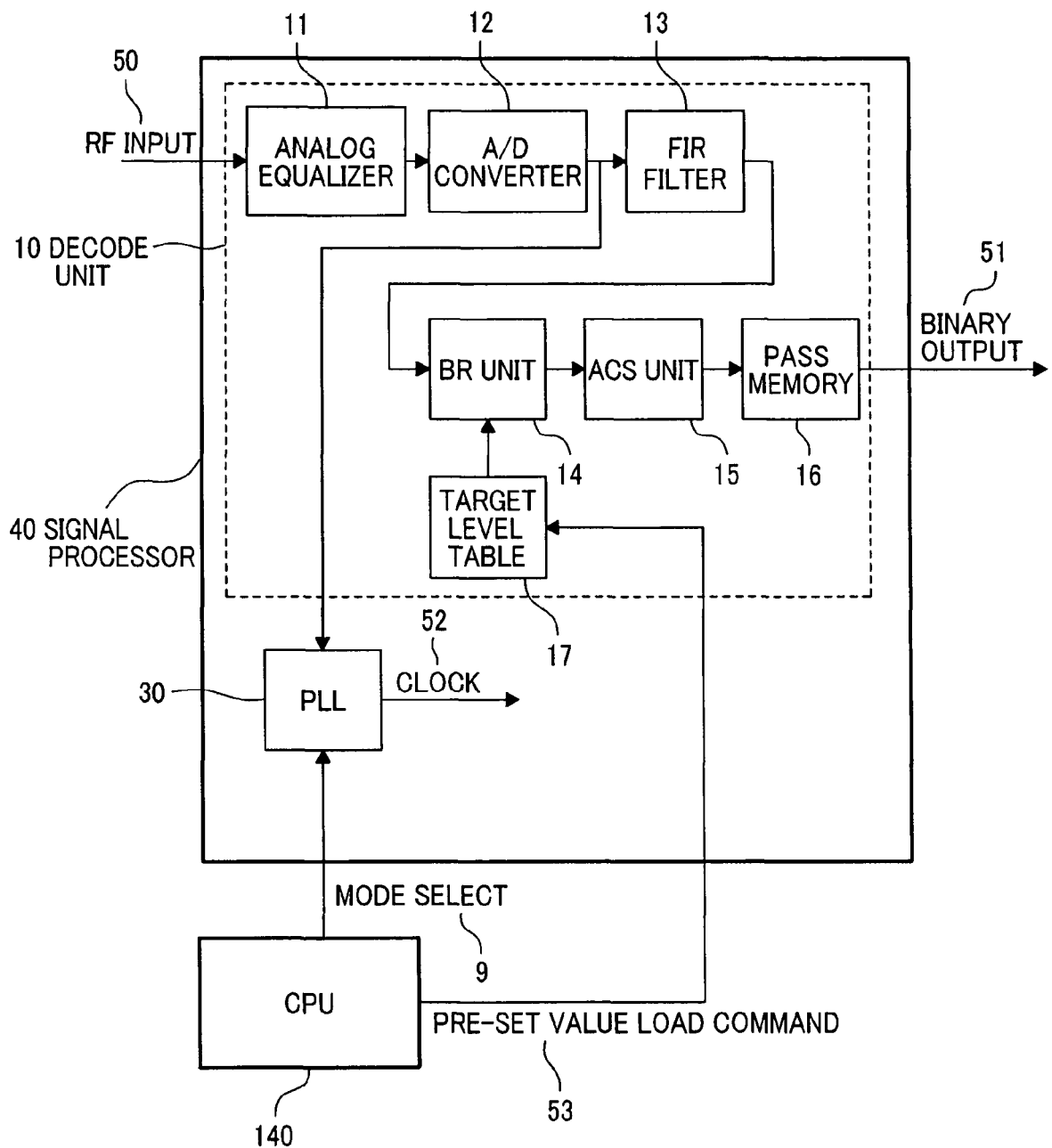
FIG. 1 shows a block diagram of a decoding circuit of an optical disc apparatus of the invention.
Figure 7:
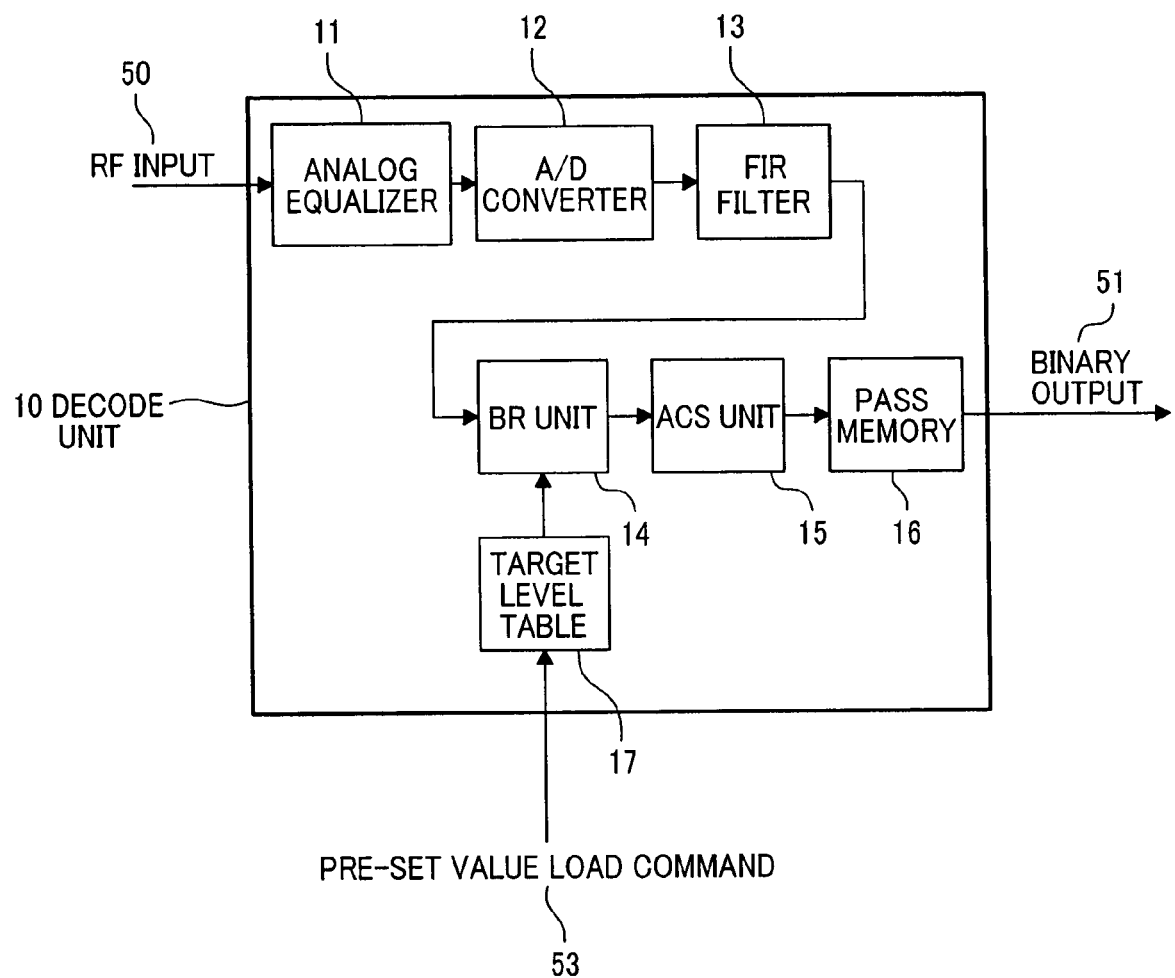
FIG. 7 shows the structure of a Viterbi decoder with an adjustable target level.
Figure 11:
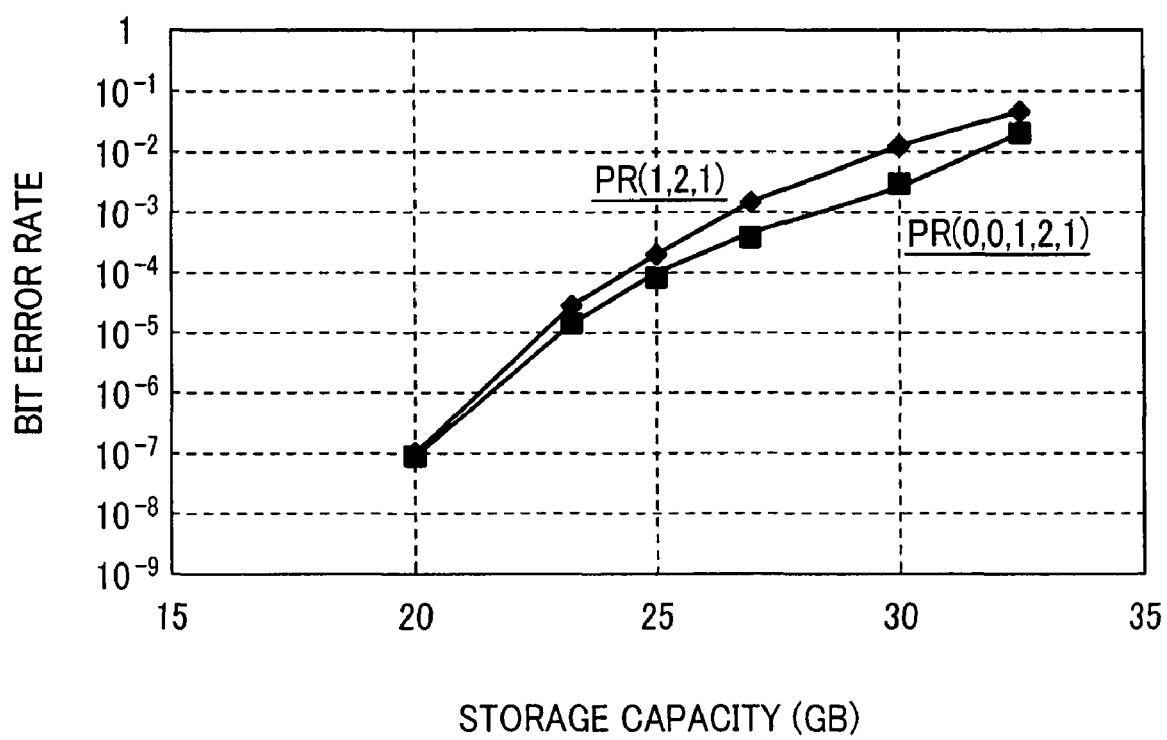
FIG. 11 shows the simulation results comparing the relationship between recording capacity and bit error rate with regard to PR(0,0,1,2,1) and PR(1,2,1).

The present embodiment involves the decoding circuit. FIG. 1 shows the diagram of an example of the decoding circuit designed to be implemented on the optical disc apparatus of the invention. This configuration includes the aforementioned Viterbi decoder with an effectively variable constraint length, and a PLL in which the detection of phase error from the minimum run-length signal can be turned on and off. A read signal processing circuit 40 comprises a decode unit 10 and a PLL 30. The operation of the Viterbi decoding unit 10 is as described with reference to FIG. 7. The internal structure and operation of the PLL 30 are as described with reference to FIGS. 16 and 17. A CPU 140 for controlling the operation of the optical disc apparatus sends a preset value setting instruction 53 to a target level table 17 as needed, such as during a verification operation, so that a decoding operation can be carried out by effectively varying the constraint length. The CPU 140 also controls the on/off of phase error detection from the minimum run-length signal by means of a mode switching instruction 9 depending on the recording density so as to stabilize the operation of the PLL 30.

Figure 23:
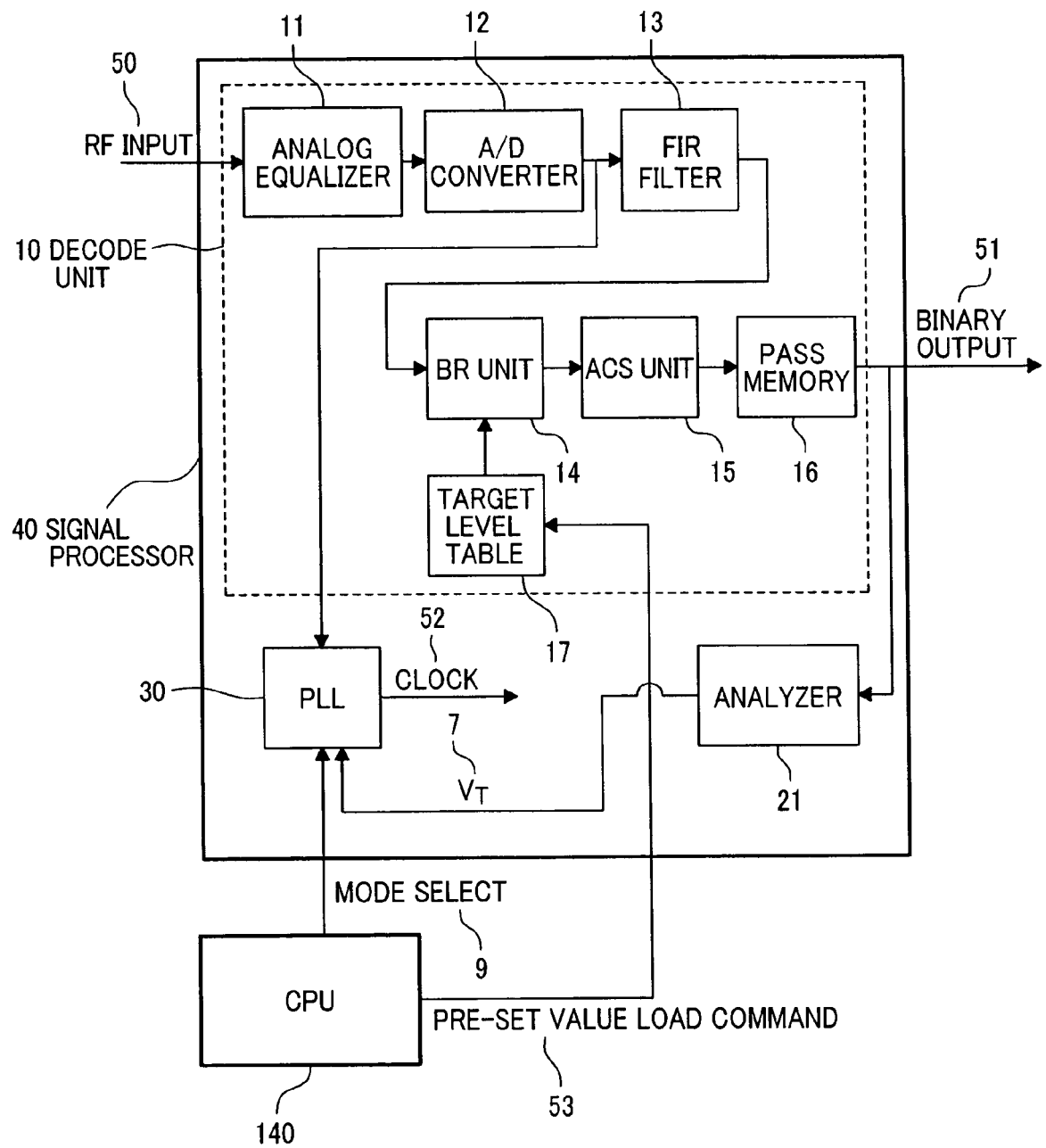
FIG. 23 shows an embodiment illustrating the structure of a decoding circuit mounted on an optical disc apparatus of the invention.

FIG. 23 shows the diagram of another example of the decoding circuit designed to be implemented on the optical disc apparatus of the invention. The present example characteristically includes a threshold calculating unit 21 for automatically generating the threshold set value $V_T$ supplied to the PLL circuit from the read signal. The structure and operation of the Viterbi decoder including the threshold calculating unit 21 have already been described with reference to FIGS. 19 and 21. Other operations of the decoding circuit are the same as those of the decoding circuit shown in FIG. 1.

Embodiment 3

The present embodiment involves an optical disc apparatus.

Figure 24:
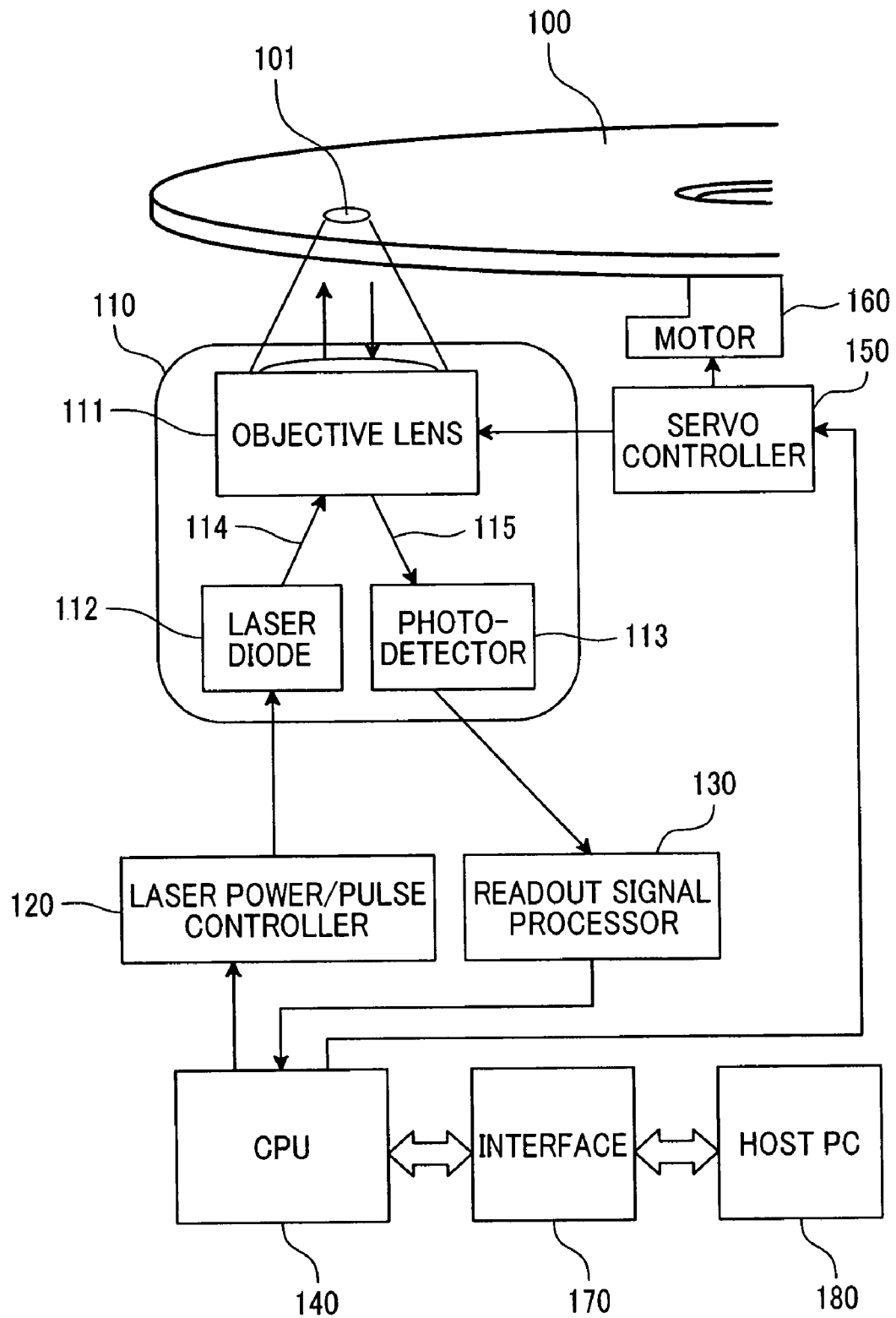
FIG. 24 shows an embodiment illustrating the structure of the optical disc apparatus of the invention.

FIG. 24 shows an example of the optical disc apparatus in accordance with the invention. An optical disc medium 100 is rotated by a motor 160. When reading, a laser power/pulse controller 120 controls the current that flows in a semiconductor laser 112 within an optical head 110 such that laser light 114 with an optical intensity as instructed by the CPU 140 can be produced. The laser light 114 is focused by an objective lens 111 and forms an optical spot 101 on the optical disc medium 100. Reflected light 115 from the optical spot 101 is detected by a photodetector 113 via the objective lens 111. The photodetector 113 is made up of a plurality of separate photodetecting elements. A read signal processing circuit 130 reads the information recorded on the optical disc medium 100 using the signal detected by the optical head 110. When recording, the laser power/pulse controller 120 converts predetermined recording data into a predetermined recording pulse current, and controls the semiconductor laser 112 such that it generates pulsed light. The decoding circuit of the invention shown in FIGS. 1 and 23 is contained in the read signal processing circuit 130. Utilizing the structures described above, the invention can provide an optical disc apparatus that is capable of recording and reading optical discs with different recording densities while ensuring read compatibility.

The invention is used in large-capacity optical disc apparatuses.

What is claimed is:

1. An optical disc apparatus comprising a Viterbi decoder configured to decode a signal read from an optical disc medium with a first recording density of a Partial Response (PR) class with a first constraint length and decode a signal read from an optical disc medium with a second recording density higher than the first recording density of a PR class with a second constraint length longer than the first constraint length, wherein said Viterbi decoder has a function of, when verifying the signal read from the optical disc medium with the second recording density, setting a predetermined bit sequence of the PR class with the second constraint length to zero to effectively vary the constraint length, thereby realizing Viterbi decoding with the first constraint length.

2. The optical disc apparatus according to claim 1, wherein said Viterbi decoder includes a target level table for setting a target level value for each predetermined bit sequence, and said constraint length is varied by changing the target level value set in said target level table.

3. The optical disc apparatus according to claim 1, further comprising a PLL circuit, wherein the polarity of a PLL clock from said PLL circuit is reversed for an odd-numbered class and an even-numbered class of said constraint length.

4. The optical disc apparatus according to claim 1, wherein said Viterbi decoder comprises an FIR filter configured to carry out equalization that is phase-shifted by approximately ½ of a clock cycle for an odd-numbered class and an even-numbered class of said constraint length.

5. The optical disc apparatus according to claim 1, further comprising a PLL circuit and a phase comparator provided in said PLL circuit, wherein said phase comparator comprises means for determininq an edge by comparing each value of an input signal sequence read by the optical disc apparatus with a designated threshold value.

6. The optical disc apparatus according to claim 5, wherein the edge determination is carried out using the magnitude of the input signal at a plurality of times.

* * * * *